United States Patent
Lavo

Patent Number: 5,386,876
Date of Patent: Feb. 7, 1995

[54] MACHINE FOR REMOVING WIDE STRIPS LAID OUT ON THE GROUND

[75] Inventor: Guy Lavo, Sancheville, France

[73] Assignee: Sarl DL System, Sancheville, France

[21] Appl. No.: 888,767

[22] Filed: May 26, 1992

[30] Foreign Application Priority Data

May 24, 1991 [FR] France ............... 91 06293
Feb. 18, 1992 [FR] France ............... 92 01832

[51] Int. Cl.⁶ ............... B65H 18/00; A01D 33/08
[52] U.S. Cl. ............... 171/43; 171/25; 171/45; 242/86.5 R; 414/501
[58] Field of Search ............... 171/25, 43, 45, 138; 414/501, 551, 467; 242/86.52, 86.51, 86.5 R

[56] References Cited

U.S. PATENT DOCUMENTS

| | | | |
|---|---|---|---|
| 2,488,983 | 11/1949 | Jackman | 171/25 |
| 2,923,487 | 2/1960 | Wands et al. | 242/86.52 |
| 3,198,259 | 8/1965 | Manuel | 171/25 |
| 3,353,297 | 11/1967 | Gervais . | |
| 3,687,392 | 8/1972 | Parry | 242/86.5 R |
| 4,253,619 | 3/1981 | Corderoy et al. | 242/86.5 R |
| 4,796,711 | 1/1989 | Chrysler | 171/1 |

FOREIGN PATENT DOCUMENTS 1521623 3/1967 France .
2235642 1/1975 France .
2562382 10/1985 France .

*Primary Examiner*—Clifford D. Crowder
*Assistant Examiner*—Amy B. Vanatta
*Attorney, Agent, or Firm*—Helfgott & Karas

[57] ABSTRACT

A machine for removing strips laid out on the ground has a rotary reception unit for winding a strip at a distance from the ground to form a reel, and a driving unit for driving the reception unit for rotation. A drum is mounted so as to rotate. The strip passes over the drum before reaching the reception unit. Rotary brushes are arranged in such a way that the strip passes between the brushes and the drum so that the strip is brushed and the material from the ground accumulated on the strip is removed therefrom. The brushes are provided with a device for driving the brushes for rotation.

16 Claims, 6 Drawing Sheets

MACHINE FOR REMOVING WIDE STRIPS LAID OUT ON THE GROUND

BACKGROUND OF THE INVENTION

The present invention relates to a machine for removing wide strips laid out on the ground, and more particularly to a machine for the field of agriculture.

During the cultivation of certain plants, wide covering strips of plastic material, especially films of polyester, polyethylene or polypropylene are laid out on the ground, the edges of which are generally buried in the soil or held by pegs and through which or under which the crops grow. Currently the operation of removing these strips or films for covering the ground is carried out by hand. It can be easily understood that this operation is fastidious and long and that the strips or films are difficult to reuse.

SUMMARY OF THE INVENTION

An object of the present invention is to provide a machine which allows the above strip removing and reprocessing operation to be carried out preferably without manual intervention and in a continuous fashion.

According to a first embodiment of the invention, the machine for removing strips laid out on the ground comprises rotary reception means for winding a strip at a distance from the ground in order to form a reel, means for driving the reception means in rotation, a drum mounted so as to turn on which the strip passes before reaching the reception means, as well as rotary brushing means arranged in such a way that the strip passes between the brushing means and the drum and applying the strip on the drum, and means for driving the brushing means in rotation.

According to the invention, the drum is preferably mounted freely for rotation.

According to the invention, the drum advantageously exhibits, at least on its end parts, diameters which diminish towards its ends.

In a preferred embodiment of the invention, the peripheral part of the drum comprises two opposing frustoconical parts and a cylindrical center part which connects them together.

According to the invention, the peripheral part of the drum is preferably composed of a multiplicity of bars which extend respectively in radial planes of the drum.

These bars preferably extend between two end plates of the drum, each bar exhibiting an elbowed central part from which they extend in a rectilinear fashion.

According to the invention, the brushing means can advantageously rotate in a direction such that they pull the strip in the direction of the above-mentioned reception means, the brushing means preferably brushing the strip in the direction of its edges.

In a preferred embodiment of the invention, the brushing means comprise at least two cylindrical brushes arranged on either side of the median radial plane of the drum, the axes of the brushes being inclined with respect to the longitudinal direction of the strip in such a way that their adjacent ends are positioned, with respect to the direction of advance of the strip, forward of their other ends, the brushes being driven in rotation in such a way as to brush the strip in the direction of its displacement, in the direction of its edges.

The machine according to the invention can, moreover, comprise means for adjusting the rotational speed of the reception means as a function of the tension of the strip upstream of the reception means.

The machine according to the invention can comprise, between the drum and the reception means, sensing means on which the strip passes, the sensing means being capable of being displaced under the effect of the displacement of the strip in the direction of its thickness and being connected to a member for adjusting the means for driving the reception means in rotation.

According to the invention, the sensing means can advantageously comprise a roller extending transversely to the strip and mounted on movable arms, at least one of the arms being connected to a movable member for adjusting the hydraulic circuit of a hydraulic motor for driving the reception means.

According to the invention, the strip preferably passes above the drum, deflective means situated close to the brushing means, above the strip, for evacuating what has been brushed to beyond the edges of the strip.

The machine according to the invention preferably comprises, moreover, unearthing ploughshares passing into the soil under at least the edges of the strip.

According to the invention, the brushing means can be preferably adjusted with respect to the drum.

According to another embodiment of the invention, the machine for removing strips laid out on the ground comprises rotary reception means for winding the strip at a distance from the ground in order to form a reel, means for driving the reception means in rotation, a drum mounted so as to turn on which the strip passes before reaching the reception means, as well as means for adjusting the rotational speed of the reception means as a function of the tension of the strip upstream of the reception means.

In a preferred embodiment, the adjusting means comprise sensing means on which the strip passes and which are arranged between the drum and the reception means, the sensing means being capable of being displaced under the effect of the displacement of the strip in the direction of its thickness and being connected to a member for adjusting the means for driving the reception means in rotation.

In a simple way, the sensing means preferably comprise a roller extending transversely to the strip and mounted on movable arms, at least one of the arms being connected to a movable member for adjusting the hydraulic circuit of a hydraulic motor for driving the reception means.

According to yet another embodiment of the invention, the machine for removing strips laid out on the ground comprises rotary reception means for winding the strip at a distance from the ground in order to form a reel, means for driving the reception means in rotation, a drum mounted so as to turn on which the strip passes before reaching the reception means, the reception means comprising a mandrel mounted on the frame of the machine by virtue of rotation means bearing its ends and exhibiting at least one movable part such that the mandrel can be separated from the frame of the machine, the mandrel exhibiting retraction means allowing its extraction from the reel formed when it is separated from the frame of the machine to enable it to be remounted on the frame.

According to the invention, the mandrel preferably comprises a multiplicity of bars forming the periphery of the mandrel, a first and a second end elements spaced out in the axial direction of the mandrel, one of the ends of the bars being articulated on the second end element, the other ends of the bars being connected to the first end element by levers which are articulated, on the one hand, on the first end element, and on the other hand, on the bars, means being provided to retain the levers in a position such that the bars are in a position away from the axis of the mandrel, the latter being in an expanded position, and to release the levers in order that the bars can approach the axis of the mandrel when the first end element is displaced axially to the mandrel, the latter thus coming into a retracted position.

According to the invention, preferably, the second end element is also connected to the ends, which are associated with it, of the bars, respectively, by means of levers articulated, on the one hand, on this second end element, and on the other hand, on the bars, means being provided to retain the levers in a position such that the bars are in a spaced position from the axis of the mandrel, the latter being in an expanded position, and to release the levers in order that the bars can approach the axis of the mandrel when the first end element is displaced axially to the mandrel, the latter thus coming into a retracted position.

According to the invention, the articulations of the levers and the bars are formed in such a way that the levers and the bars can be pivoted in radial planes.

According to the invention, the end element preferably comprises an end plate, and the associated retaining means preferably comprise a retaining plate on the outside of the end plate, the levers exhibiting extensions extending between the plates when the mandrel is in its retracted position, and when, in order to pass from its expanded position to its retracted position, the end element is displaced towards the outside.

In one embodiment, the retaining plate is mounted so as to turn on the associated end element and exhibits slots which allow the passage of the extensions when the slots are brought opposite the extensions.

In yet another embodiment, the plate is mounted on the frame of the machine.

According to the invention, the rotation means are preferably formed by two opposing shafts mounted on the frame and which can be axially displaced to release the end elements.

The present invention will be better understood by studying a machine for removing wide strips laid out on the ground, described by way of a non-limiting example which is illustrated diagrammatically by the drawings:

DETAILED DESCRIPTION OF THE PREFERRED EMBODIMENTS

Figure 1:
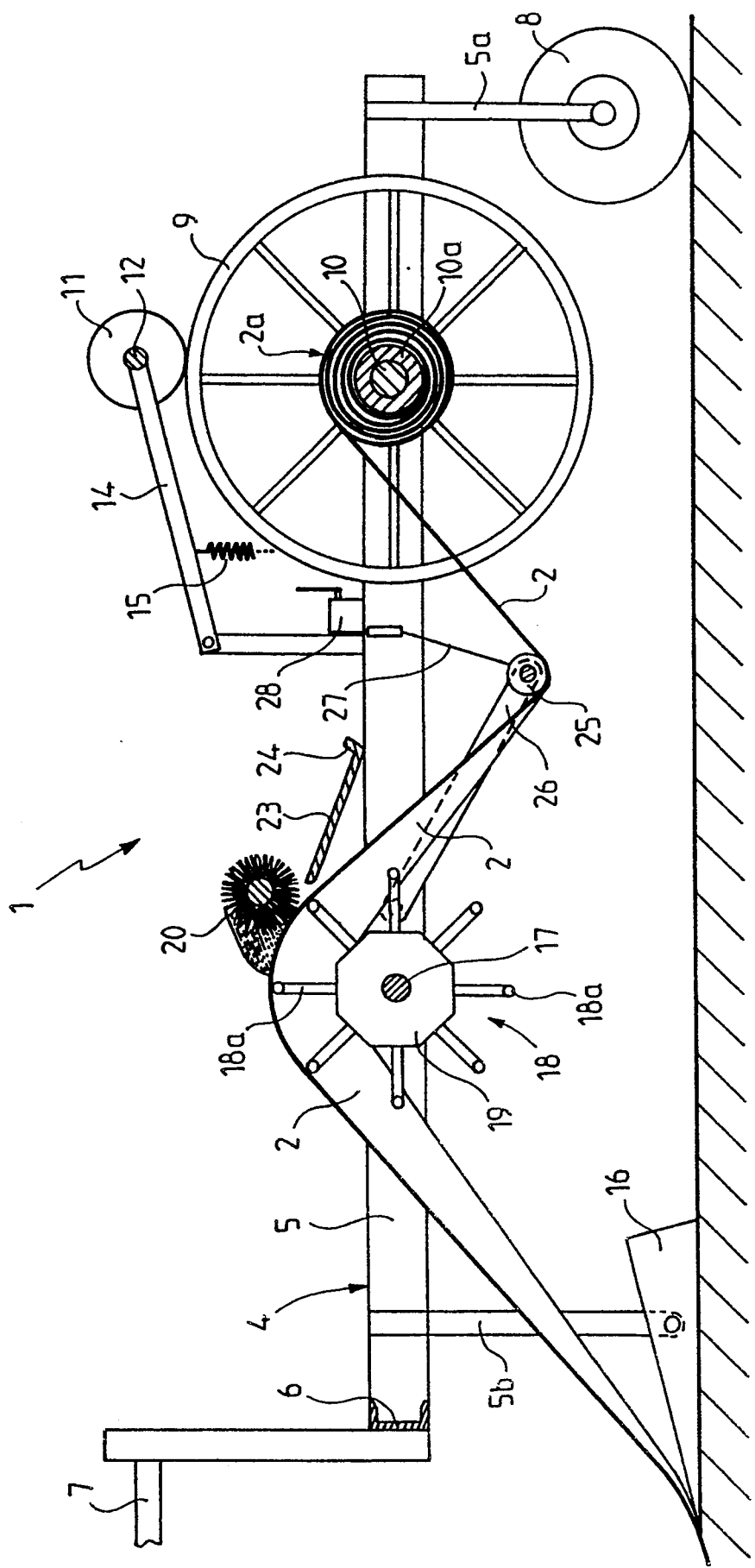
FIG. 1 diagrammatically represents a longitudinal section of the machine according to the invention.

The machine shown in the figures and designated in a general manner by the reference numeral 1 is designed for removing a wide strip 2 laid out on the ground and the longitudinal edges 3 of which are covered with soil, this machine being capable of being towed and moved longitudinally to the strip 2, for example, by a tractor which is not shown.

The machine 1 comprises a frame designated in a general manner by the reference numeral 4 which comprises essentially two longitudinal beams 5 separated from one another and one forward cross beam 6 which connects them and on which are provided means for anchoring the frame to the tractor, such as an arm 7, this frame 4 thus constituting a horizontal U opened towards the rear. Naturally, other cross beams and especially a rear cross beam could have been provided.

In the example, at their rear portion, the longitudinal beams 5 bear, by means of arms 5a extending downwards, two opposing wheels 8 for rolling along the ground.

Figure 2:
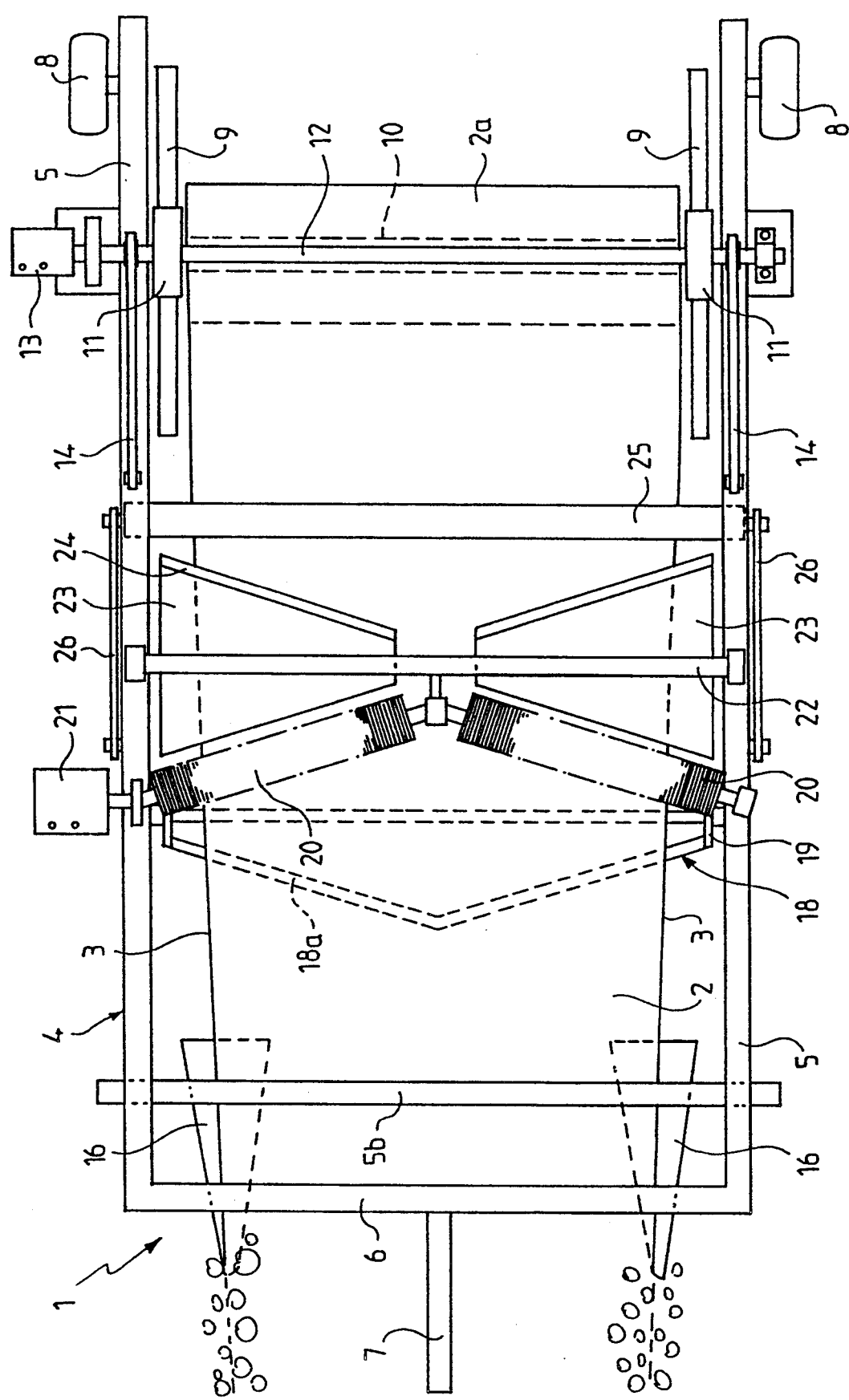
FIG. 2 is a plan view of the machine.

At their rear portion, the longitudinal beams 5 bear, opposite each other and between them, two large coaxial wheels 9 with spokes, which do not touch the ground and which are, in the embodiment of FIGS. 1 and 2, linked in rotation by a transverse movable shaft 10. The transverse distance between the wheels 9 is preferably greater than the width of the strip 2.

The wheels 9 are capable of being driven for rotation by running wheels 11 which press upon their periphery, at the top, and which are mounted on a common transverse shaft 12 driven by a hydraulic motor 13, wheels 11 and shaft 12 being mounted at the end of two opposing arms 14 articulated on the longitudinal beams 5 and acted upon by springs or tensioners 15 acting in the direction which applies the running wheels 11 against the wheels 9 in order to obtain a friction drive which can be adjusted by the tension of springs or tensioners 15.

At its front portion, frame 4 bears, by the means of arms 5b extending downwards, two unearthing ploughshares 16 which are pointed towards the front and which are at ground level, the distance between these ploughshares 16 being slightly less than the width of the strip 2. Naturally, the distance between these unearthing ploughshares 16 is adjustable in order to be able to adapt to different widths of strips to be removed and their positions are equally adjustable by any known means.

In front of the wheels 9 and behind the ploughshares 16, the longitudinal beams 5 bear, free for rotation, the ends of a transverse shaft 17 which bear, between these longitudinal beams 5, a transverse drum 18.

The transverse drum 18 exhibits at its ends two radial opposing plates 19 and its peripheral part is formed, in the embodiment, by eight transverse bars 18a of cylindrical cross-section which are, in their middle part, elbowed, which extend in a rectilinear fashion as far as the plates 19 and which are uniformly distributed, in such a manner as to form two opposing cone sections, the drum 18 exhibiting consequently diameters which diminish towards each of its ends.

The frame 4 bears, moreover, two cylindrical brushes 20 which are associated to the two frustoconical parts of the drum 18 and which are arranged such that these brushes 20 are linked in rotation by any known means and driven for rotation by a hydraulic motor 21. They are, moreover, able to be adjusted in height with respect to the drum 18 by virtue of slides 20a.

The two cylindrical brushes 20, which are arranged on either side of the median radial plane of the drum 18 and which extend over all of its length are inclined with respect to the longitudinal direction of the strip in such a way that their adjacent ends are behind their other ends, their adjacent ends being borne by a cross beam 22 of the frame 4. The cross beam is connected to the longitudinal beams 5.

Behind and below the two brushes 20, are provided two deflectors 23 which are inclined towards the rear and which exhibit an upturned rear edge 24, the deflectors 23 being inclined towards the rear and towards the lateral sides of the machine.

Between the wheels 9 and the drum 18, is provided a transverse roller 25 whose ends are borne by two inclined arms 26 whose other ends are articulated on the longitudinal beams 5.

One of its arms 26 is connected by a tie bar 27 to the movable element for adjusting a hydraulic distributor 28 mounted on the hydraulic circuit of the motor for driving the running wheels 11.

The method in which the machine 1 can be used and how the machine operates will now be described.

Firstly, the end portion of a strip 2 which is buried by its edges in the ground is lifted up.

Strip 2 is passed longitudinally over the unearthing ploughshares 16, over the drum 18 whilst extending it over the latter, between the drum 18 and the brushes 20, under the deflectors 23, under the transverse roller 25, and is brought to between the wheels 9 where it is attached. To make matters simple, one of the end corners of the strip is attached to one of the bars of one of the wheels 9.

The machine is ready to operate.

The machine 1 is hitched to a tractor and the hydraulic motors 13 and 21 are connected to the hydraulic circuit of the tractor.

Gradually as the machine 1 advances, the ploughshares 16 unearth the longitudinal edges of the strip 2, this strip 2 rises towards the drum, passes over the latter and under the cylindrical transverse brushes 20, descends under the transverse roller 25, then winds around a cylindrical core 10a which has previously been mounted on the shaft 10 of the wheels 9 to form a reel 2a. Between the ground and the brushes 20, the strip 2 is taut and pulled by virtue of the combined effects of the brushes and of the barrel shape of the drum 18. In fact, the cylindrical brushes 20, which press quite strongly on the upper surface of the strip 2 in the direction of the drum 18 brush the strip in the direction of its advancement and in the direction of its longitudinal edges, going faster than the strip, thus engendering its traction and keeping it permanently flat on the drum, the strip 2 and the brushes 20 causing the drum 18 to turn.

At the same time, the material which is on the upper surface of the strip is evacuated by the brushes 20 towards the deflectors 23 and falls back onto the ground on either side of the strip. Of course, the cylindrical brushes 20 are mounted in such a way that they can be adjusted with respect to the drum 18 in order to be able to adjust their action on the strip 2.

Between the drum 18 and the reel 2a the strip 2 is taut under the effect of the weight of the transverse roller 25, this effect being adjustable by any means, for example by springs supporting the roller 25 by acting on the arms 26.

The rotational speed of the wheels 9 is adjusted in such a way as to take account of the speed of advancement of the machine 1 and of the increasing diameter of the reel 2a formed, in the following manner.

If the wheels 9 turn faster than is required, the strip tightens between the drum 18 and the reel 2a and moves the transverse roller 25 upwards. The tie bar 27 then moves the control element of the distributor 28 in such a manner as to reduce the rotational speed of the hydraulic motor. The reverse effect is produced when the strip 2 relaxes between the reel and the drum 18. Thus, while advancing, the transverse roller 25 occupies substantially a median part, its uppermost position corresponding to a stopping of the hydraulic motor 13 and consequently a stopping of the rotation of the reel 2a, and its lowest position corresponds to the maximum possible rotational speed of this reel, corresponding to a maximum possible speed of advance of the machine 1. In this way, the rotational speed of the reel 2a is a function of the tension of the strip 2 between the drum and this reel.

When the reel 2a is considered to be full, the shaft 10 is removed, by pulling it in a transverse direction. The reel 2a falls on the ground between the wheels 9 and it is taken away through the rear.

A new cylindrical core 10a is mounted to replace the old one and the shaft 10 is reinserted to make a new reel as has been described previously.

If it is desired to recover the reel 2a for the purpose of reprocessing it at a factory, it is desirable that it should not contain the core 10a.

Extractable mandrels which can be mounted on the frame 4 of the machine 1 will now be described.

Figure 3:
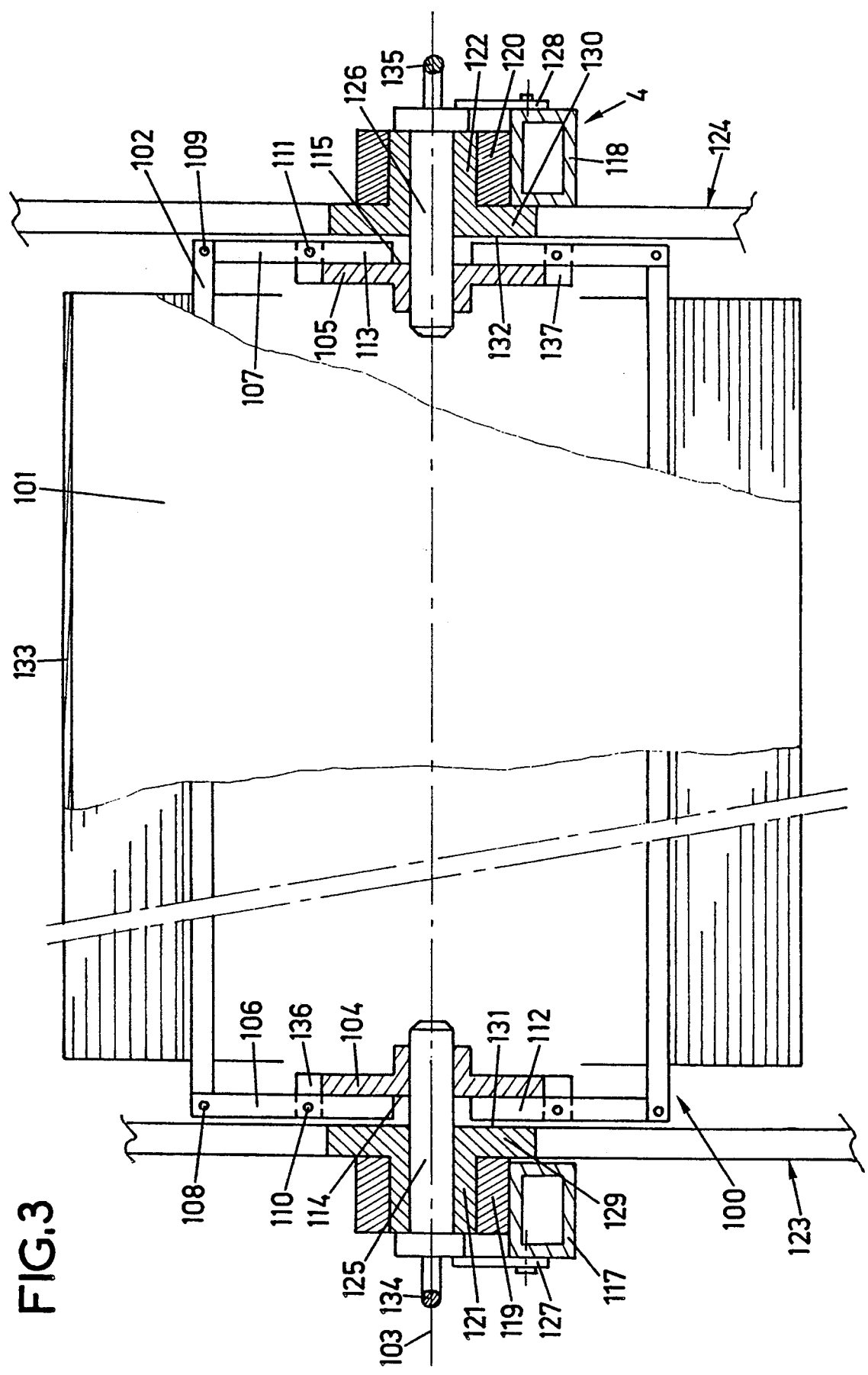
FIG. 3 represents, in an axial section and in the expanded position, a first extractable mandrel mounted on the frame of the machine according to the present invention.
Figure 4:
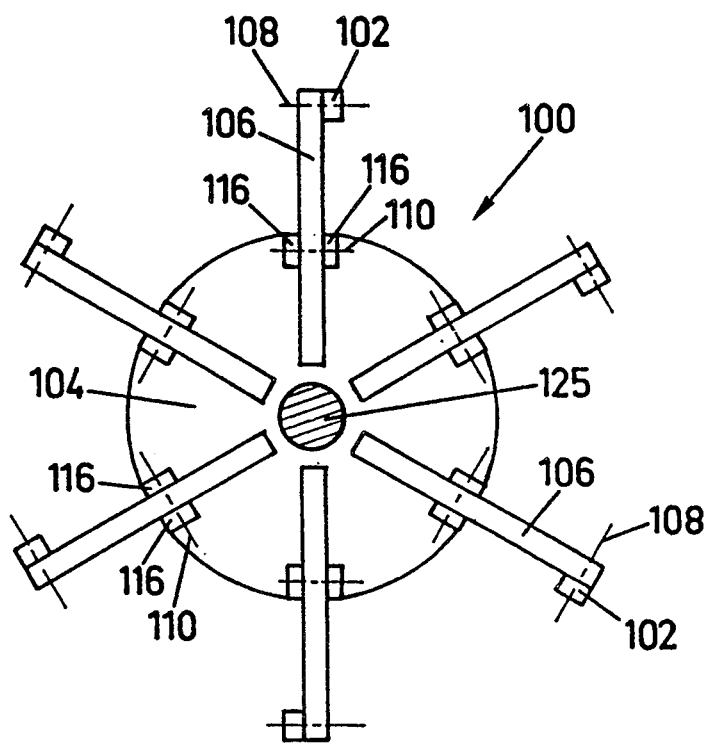
FIG. 4 is an end view of the mandrel shown in FIG. 3.
Figure 5:
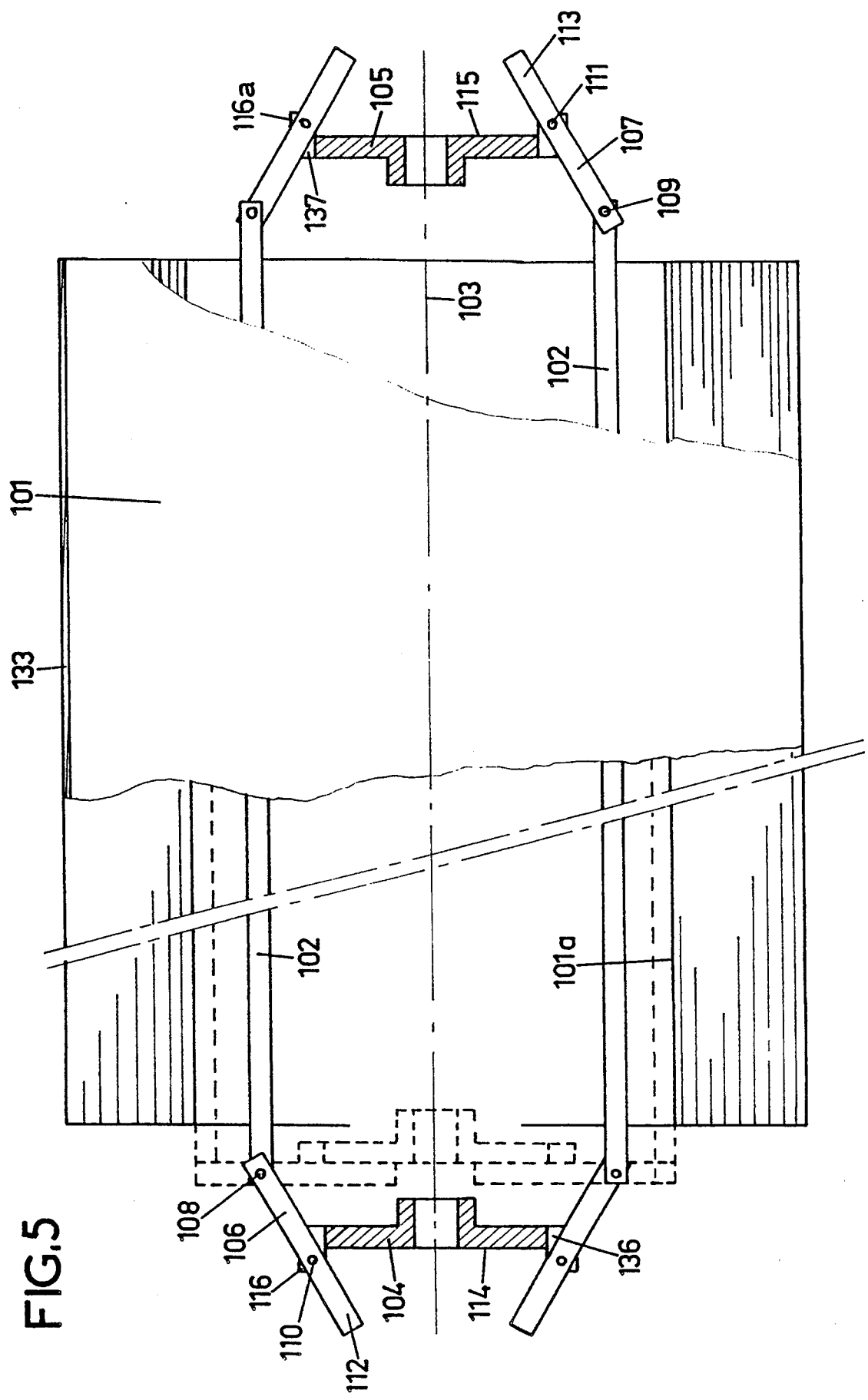
FIG. 5 shows the mandrel of FIG. 3 in an axial section and in the retracted and removing position.

The extractable mandrel shown in FIGS. 3 to 5, which is generally designated by the reference 100, comprises a peripheral part around which a reel 101 can be formed, the reel comprising, in the embodiment, six bars 102 parallel to the axis 103 of the mandrel and which are arranged at 60° to each other.

The ends of each of these bars 102 are respectively connected to two end elements spaced out along the length of the axis 103, which are formed in the embodiment by two end plates 104 and 105, by means of six levers 106 and 107 which extend in radial planes. The levers 106 and 107 are respectively connected to the ends of the bars 102 by articulation pins 108 and 109 and are respectively connected to the periphery of the plates 104 and 105 by means of articulation pins 110 and 111. The pins 108, 109 and 110, 111 are such that the levers 106 and 107 can pivot in radial planes.

In the embodiment shown, the bars 102 are of rectangular cross-section and the levers 106 and 107 are of rectangular cross-section, their ends bearing the articulation pins 108 and 109 being coupled. Cylindrical bars 102 connected to the levers 106 and 107 by knuckle joints could, however, have been provided.

The levers 106 and 107 respectively exhibit extensions 112 and 113 which extend beyond the articulation pins 110 and 111, in front of the external radial faces 114 and 115 of the plates 104 and 105.

In order that the extensions 112 and 113 of the levers 106 and 107 can abut against the external faces 114 and 115 of the plates 104 and 105; these plates are respectively equipped with six pairs of projections 116 and 116a which bear the articulations 110 and 111 of the levers 106 and 107.

By referring to FIG. 3, it can be seen that the mandrel 101 is in the winding position, i.e. in the expanded position, in which the levers 106 and 107 extend radially, their extensions 112 and 113 being in abutment against the external radial faces 114 and 115 of the plates 104 and 105, and that it is mounted, in the following manner, on the frame 4 of the machine, which comprises two longitudinal parallel beams 117 and 118 which correspond to the longitudinal beams 5 of the embodiment described with reference to FIGS. 1 and 2.

The longitudinal beams 117 and 118 bear respectively bearings 119 and 120 in which are mounted so as to turn, the hubs 121 and 122 of two opposing wheels 123 and 124 which pass between the longitudinal beams 117 and 118.

Rotation shafts 125 and 126, which are also inserted into the plates 104 and 105 of the mandrel 100 are inserted from the outside through the hubs 121 and 122 of the wheels 123 and 124.

In order to retain the shafts 125 and 126 in this mounted position, the longitudinal beams 117 and 118 bear pivoting plates 127 and 128 which come in front of the shouldered ends of the shafts 125 and 126.

The wheels 123 and 124 exhibit respectively central parts in the form of plates 129 and 130, which plates exhibit radial faces 131 and 132 which extend opposite each other and at a distance from the radial faces 114 and 115 of the plates 104 and 105 of the mandrel 100, in such a way that the extensions 112 and 113 of the levers 106 and 107 extend respectively between the plates 104, 129 and 105, 130, the levers 106 and 107 being thus maintained in the radial position.

By causing the mandrel 100 and the wheels 123 and 124 to turn together about the opposing shafts 125 and 126, a strip 133 can be wound up in such a manner as to form the reel 101 around the bars 102. In order to do this, the plate 104 and the plate 129, on the one hand, and the plate 105 and the plate 130, on the other hand, can be connected in rotation by any known means. In a simple way, as in the embodiment described with reference to FIGS. 1 and 2, the end of the strip 133 can quite simply be fixed at the beginning to one of the wheels 123 or 124 or to both.

When the reel 101 has been formed around the mandrel 100 borne by the frame 4 as shown in FIG. 3, it can then be removed in the following simple manner.

After having opened out the retaining plates 127 and 128, the articulation shafts 125 and 126 are extracted by pulling them axially towards the outside by means of the handles 134 and 135 with which they are equipped. This operation releases the mandrel 100 and the mandrel 100-reel 101 assembly falls to the ground. The reel 101 is then taken away from the frame 4.

In order to extract the mandrel 100 from the reel 101, the following procedure is carried out.

The plates 104 and 105 are pulled axially towards the outside in the direction which opens them out. Whilst doing this, the levers 106 and 107 pivot in radial planes. In order that the levers 106 and 107 can pivot in this manner, the plates 104 and 105 exhibit at their periphery slots 136 and 137. The extensions 112 and 113 are distanced from the faces 114 and 115 of the plates 104 and 105, and the bars 102 move towards the axis 103. The mandrel 100 thus assumes the retracted position represented in a solid line in FIG. 5, coming from the expanded position represented in broken lines.

With the envelope of bars 102 now exhibiting a diameter which is less than the interior diameter 101a of the reel 101, the mandrel 100 is extracted by pulling on one of its ends.

The reel 101 recovered by virtue of the machine 1 can then be sent to a reprocessing factory.

In order to replace the mandrel 100 on the frame 4 of the machine 1, it is taken by one of the bars 102 and it is lifted up. It thus resumes its expanded position. It is brought between the wheels 123 and 124 and the shafts 125 and 126 are inserted in such a manner as to reassemble it. The mandrel 100 is thus ready to be used again on the machine 1.

Figure 7:
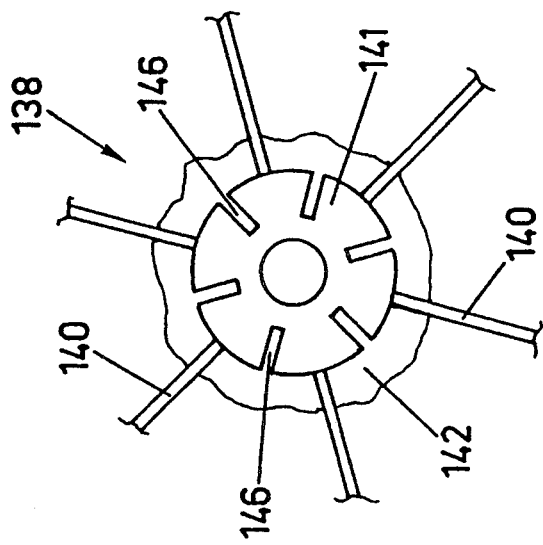
FIG. 7 represents, partially, an end view of the mandrel of FIG. 6.
Figure 6:
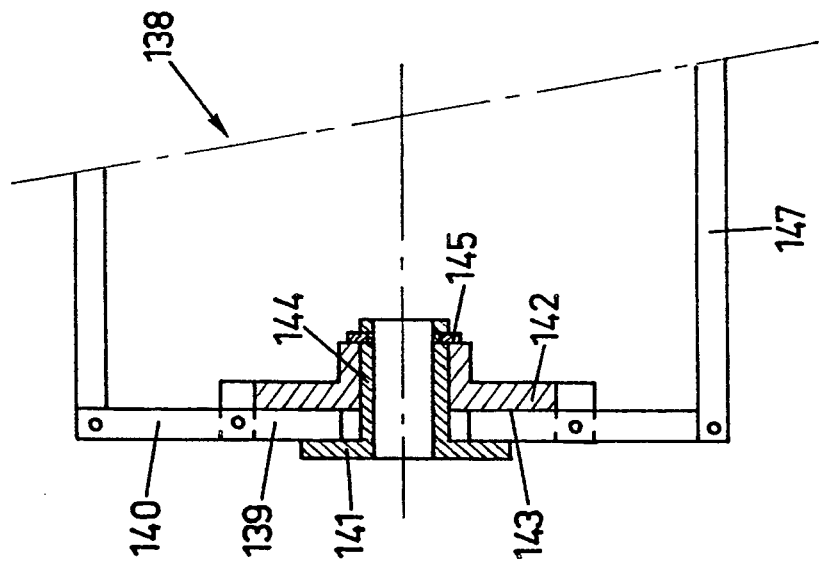
FIG. 6 represents, in axial section and in the expanded position, one of the ends of a second mandrel according to the present invention.

Referring now to FIGS. 6 and 7, it can be seen that a mandrel, designated in a general manner by the reference 138, is represented, which mandrel differentiates from the mandrel 100 described previously only by that the means for retaining the extensions 139 for its six pivoting levers 140 in the radial position comprise a plate 141 which is solidly fixed to the end plate 142.

The plate 141 extends opposite and at a distance from the external radial face 143 of the end plate 142 to which it is connected by means of a tubular sleeve 144 which bears an axial retention member such as a circlip 145 arranged at the opposite side of the plate 141.

The plate 141 exhibits slots 146 in such a way that, when these slots 146 are brought opposite the extensions 139, the levers 140 can pivot as previously in such a manner as to radially move the peripheral bars 147 of the mandrel 138 whereas when its slots 146 are not opposite the extensions 149, the plate 141 covers up the extensions 139 of the levers 140 and retains the latter in the radial position.

Of course simple means, for rotatably connecting the plate 141 and the plate 143 when this plate 141 is in retention position, can be provided, it being possible for these means to be made up of a pin.

At its other end, the mandrel 138 can exhibit the same assembly. Of course, the mandrel shown in FIGS. 6 and 7 no longer requires complementary means associated with the frame of the machine which were formed in the preceding example by the plates 129 and 130.

Of course, in a simplified embodiment, levers pivoting only at one of the ends of the mandrels could have been provided, the other end of the bars being articulated directly on the end element associated, the mandrel then exhibiting, in the retracted position, a truncated-cone shape permitting it to be removed from the inside of a reel by its side of greater diameter.

The present invention is not limited to the embodiments described. Many different embodiments are possible, especially insofar as the rotary reception means for winding the strip in such a manner as to form a reel, the structure of the drum and the constituent parts of the brushing means and of the mandrel are concerned. Brushing means could, moreover, be provided for brushing the lower surface of the strip. In particular, these brushing means could be formed by a cylindrical brush associated with the transverse roller 25, borne by the arms 26 and end-driven by a hydraulic motor borne by these arms.

Many other embodiments are possible without leaving the scope defined by the appended claims.

I claim:

1. A machine for removing longitudinal strips laid out on the ground, comprising:
transversal rotary reception means for receiving a longitudinal strip raised from the ground, said reception means positioned transversely of a direction of elongation of the strip, and including mandrel means for winding the longitudinal strip at a distance from the ground to form a reel;

means for driving said reception means for rotation;

means for adjusting a rotational speed of said reception means, said adjusting means having an adjusting member acting on said driving means;

a transversal rotary drum disposed transversely of said direction of elongation and ahead of said reception means, the strip passing onto said drum before reaching said reception means;

said adjusting means including transverse roller sensing means which are arranged after said drum and ahead of said reception means in said direction of elongation and in contact with the strip, said sensing means being connected to said adjusting member, so that as the strip rises from the ground the strip passes over said drum and under said sensing means before reaching said reception means and wherein said sensing means acts on the strip and is sensitive to a lateral displacement of the strip in the direction of a thickness thereof, between said drum and said reception means;

rotary brushing means disposed laterally of said drum to contact said strip; and means for driving said brushing means for rotation, so that as the strip rises from the ground and passes between said brushing means and said drum, the strip is applied onto said drum by said brushing means and a displacement of the strip towards said reception means causes said drum to rotate, said brushing means including at least two cylindrical brushes each being arranged on either side of a median radial plane of said drum and axes of said brushes being inclined with respect to the direction of elongation of the strip in such a way that adjacent ends of said brushes are, with respect to the direction of advance of the strip, forward of other ends of said brushes, said brushes being driven in rotation in such a way as to brush the strip in the direction of the displacement thereof and in the direction of edges thereof.

2. Machine according to claim 1, wherein said drum has at least on end parts thereof, diameters which diminish towards ends of the drum, respectively.

3. Machine according to claim 1, wherein a peripheral part of the drum has two opposing frustoconical parts and a cylindrical central part which connects said frustoconical parts together.

4. Machine according to claim 1, wherein a peripheral part of said drum is composed of a multiplicity of bars which extend respectively in radial planes of said drum.

5. Machine according to claim 4, wherein said bars extend between two end plates of the drum, each bar having an elbowed central part from which two bar parts extend in a rectilinear fashion.

6. Machine according to claim 1, wherein said sensing means includes a roller extending transversely to the direction of elongation of the strip and mounted on movable arms, at least one of said arms being connected to a movable member for adjusting a hydraulic circuit of a hydraulic motor for driving said reception means.

7. Machine according to claim 1, and further comprising deflecting means, wherein as the strip passes above said drum said deflecting means which is situated close to said brushing means, above the strip, evacuates a material which is brushed to beyond the edges of the strip.

8. Machine according to claim 1, and further comprising unearthing ploughshares passing into the ground under at least the edges of the strip.

9. Machine according to claim 1, wherein said brushing means is adjusted with respect to said drum.

10. Machine according to claim 1, wherein said mandrel includes a first and a second end elements spaced out in the axial direction of the mandrel, said bars being each articulated at one end thereof on the second end element, other ends of said bars being connected to the first end element by first levers which are articulated on the first end element, and first retaining means being provided on said bars to retain said first levers in a position such that the bars are in a position away from the axis of the mandrel to place the mandrel in an expanded position, and to release said first levers in order that the bars can approach the axis of the mandrel when the first end element is displaced axially to the mandrel to place the mandrel into a retracted position.

11. Machine according to claim 10, wherein the second end element is also connected to respective ends of the bars by second levers articulated on the second end element, and second retaining means being provided on said bars to retain said second levers in a position such that the bars are in a distanced position from the axis of the mandrel to place the mandrel in an expanded position, and to release said second levers in order that the bars can approach the axis of the mandrel when the first end element is displaced axially to the mandrel to place the mandrel into a retracted position.

12. Mandrel according to claim 11, wherein articulations of said levers and said bars are formed in such a fashion that said levers and said bars can be pivoted in radial planes.

13. Machine according to claim 12, wherein each said end element comprises an end plate and each retaining means includes a retaining plate on the outside of said end plate, said first and second levers having extensions extending between the end plates when the mandrel is in said retracted position, and in order to pass from said expanded position to said retracted position, said end element is displaced towards the outside.

14. Machine according to claim 13, wherein said retaining plate is mounted so as to turn the associated end element and has slots which allow a passage of said extensions when said slots are brought opposite said extensions.

15. Machine according to claim 13, wherein said retaining plate is mounted on said frame of the machine.

16. Machine according to claim 15, wherein rotation means which are formed by two opposing shafts are mounted on the frame and which can be axially displaced to release said end elements.

* * * * *